(12) United States Patent
Coco

(10) Patent No.: US 10,463,197 B2
(45) Date of Patent: Nov. 5, 2019

(54) COOKING OIL STORAGE AND FILTRATION SYSTEM

(71) Applicant: Sal Coco, Corona, CA (US)

(72) Inventor: Sal Coco, Corona, CA (US)

( * ) Notice: Subject to any disclaimer, the term of this patent is extended or adjusted under 35 U.S.C. 154(b) by 695 days.

(21) Appl. No.: 14/460,919

(22) Filed: Aug. 15, 2014

(65) Prior Publication Data
US 2015/0101966 A1 Apr. 16, 2015

Related U.S. Application Data

(63) Continuation-in-part of application No. 14/273,899, filed on May 9, 2014, now abandoned, which is a continuation-in-part of application No. 13/745,420, filed on Jan. 18, 2013.

(60) Provisional application No. 61/588,144, filed on Jan. 18, 2012.

(51) Int. Cl.
*A47J 37/12* (2006.01)

(52) U.S. Cl.
CPC .................. *A47J 37/1223* (2013.01)

(58) Field of Classification Search
None
See application file for complete search history.

(56) References Cited

U.S. PATENT DOCUMENTS

| | | | |
|---|---|---|---|
| 2,247,040 A | 6/1941 | Whitsett | |
| 2,425,848 A | 8/1947 | Vawter | |
| 2,902,161 A * | 9/1959 | Humbert, Jr. | B01D 25/02 210/241 |
| 3,206,077 A * | 9/1965 | Fetterman | B65D 88/744 137/340 |
| 3,263,818 A | 8/1966 | Gedrich | |
| 3,279,605 A | 10/1966 | Shepherd | |
| 3,355,026 A | 11/1967 | Schut | |
| 3,368,682 A | 2/1968 | Boots | |
| 3,400,824 A | 9/1968 | Weimer et al. | |
| 3,616,907 A | 11/1971 | Van Vleet | |
| 3,630,361 A | 12/1971 | Keating | |
| 3,701,313 A | 10/1972 | Boggs | |
| 3,707,907 A | 1/1973 | Wilson et al. | |
| 3,735,693 A * | 5/1973 | Pelster | A47J 37/1223 99/403 |
| 3,900,580 A * | 8/1975 | Boggs | A47J 37/1233 210/167.28 |
| 4,084,492 A | 4/1978 | Sullivan | |
| 4,095,673 A | 6/1978 | Takeuchi | |
| 4,113,623 A | 9/1978 | Koether et al. | |
| 4,195,667 A * | 4/1980 | Moore | A47J 37/1223 137/637.1 |
| 4,210,123 A * | 7/1980 | Moore | A47J 37/1223 126/374.1 |
| 4,210,177 A * | 7/1980 | Moore | A47J 37/1223 137/613 |
| 4,230,574 A * | 10/1980 | Whaley | A47J 37/1223 210/193 |

(Continued)

*Primary Examiner* — Robert J Popovics
(74) *Attorney, Agent, or Firm* — Knobbe, Martens, Olson & Bear, LLP

(57) ABSTRACT

A system for pumping cooking oil from a filtration device or cooking oil reservoir to a storage tank or back into the cooking oil reservoir. The system can also be used to pump oil from the storage tank to a disposal location. The system can include a pump used to pump oil from one location to another. The system can include a housing for containing the pump and/or the storage tank. The system can include a fresh oil storage tank.

14 Claims, 14 Drawing Sheets

(56) References Cited

U.S. PATENT DOCUMENTS

| | | | |
|---|---|---|---|
| 4,259,567 A * | 3/1981 | Moore | A47J 37/1238 361/194 |
| 4,282,094 A | 8/1981 | Mitchell | |
| 4,324,173 A * | 4/1982 | Moore | A47J 37/1223 134/169 R |
| 4,360,046 A | 11/1982 | Streit et al. | |
| 4,485,831 A * | 12/1984 | Ungerleider | A47J 37/1271 137/1 |
| 4,502,373 A | 3/1985 | Keating | |
| 4,513,614 A | 4/1985 | Adcock | |
| 4,517,082 A | 5/1985 | Prudhomme | |
| 4,583,170 A * | 4/1986 | Carlin | E21B 43/12 340/6.1 |
| 4,591,434 A | 5/1986 | Prudhomme | |
| 4,622,135 A | 11/1986 | Williams | |
| 4,623,455 A | 11/1986 | Adcock | |
| 4,646,793 A * | 3/1987 | Sherratt | A47J 37/1271 137/358 |
| 4,688,475 A * | 8/1987 | Witt | A47J 27/62 700/90 |
| 4,702,827 A * | 10/1987 | Wenzel | A47J 37/1223 210/117 |
| 4,768,426 A | 9/1988 | Nett | |
| 4,826,590 A | 5/1989 | Turman | |
| 4,913,922 A * | 4/1990 | Hawkes | A23L 5/11 426/417 |
| 4,945,893 A * | 8/1990 | Manchester | A47J 37/1223 126/391.1 |
| 4,959,144 A | 9/1990 | Bernard et al. | |
| 4,974,501 A * | 12/1990 | Grob | A47J 37/1223 210/DIG. 8 |
| 4,991,608 A | 2/1991 | Schweiger | |
| 5,049,264 A | 9/1991 | Rosnack et al. | |
| 5,112,479 A | 5/1992 | Srimongkolkul | |
| 5,139,678 A | 8/1992 | Frederick, Jr. et al. | |
| 5,160,444 A * | 11/1992 | McFarland | B01D 29/15 210/120 |
| 5,172,328 A * | 12/1992 | Cahlander | A47J 27/14 700/112 |
| 5,179,891 A | 1/1993 | Chiu | |
| 5,186,097 A * | 2/1993 | Vaseloff | G05D 23/1951 219/492 |
| 5,209,218 A * | 5/1993 | Daneshvar | A47J 37/1247 126/374.1 |
| 5,228,985 A * | 7/1993 | Wells | A47J 37/1223 210/167.28 |
| 5,243,898 A | 9/1993 | Sakuma | |
| 5,247,876 A | 9/1993 | Wilson et al. | |
| 5,249,511 A * | 10/1993 | Shumate | A47J 37/1223 137/358 |
| 5,340,471 A | 8/1994 | Wilson et al. | |
| 5,417,851 A * | 5/1995 | Yee | B01D 29/072 210/167.01 |
| 5,423,979 A | 6/1995 | Allen | |
| 5,458,772 A * | 10/1995 | Eskes | B01D 29/05 210/232 |
| 5,487,907 A * | 1/1996 | Drown | C11B 1/14 134/25.3 |
| 5,510,023 A | 4/1996 | Taylor | |
| 5,597,601 A * | 1/1997 | Griffin | A47J 37/1223 210/167.28 |
| 5,609,193 A * | 3/1997 | Steckler | A47J 37/1271 137/341 |
| 5,617,777 A * | 4/1997 | Davis | A47J 37/1223 210/167.28 |
| 5,629,039 A * | 5/1997 | Brintle | A47J 37/1223 210/DIG. 8 |
| 5,731,024 A * | 3/1998 | Bivens | A47J 37/1223 210/167.28 |
| 5,776,530 A * | 7/1998 | Davis | A47J 37/1266 426/233 |
| 5,782,164 A * | 7/1998 | Brintle | A47J 37/1223 99/330 |
| 5,812,060 A * | 9/1998 | DeSpain | A47J 37/1266 340/618 |
| 5,839,360 A * | 11/1998 | Williams | A47J 37/1223 210/167.28 |
| 5,847,365 A * | 12/1998 | Harter | A47J 27/62 219/442 |
| 5,861,093 A * | 1/1999 | Bennett | B01D 29/05 210/167.04 |
| 5,870,945 A | 2/1999 | Bivens | |
| 5,961,612 A * | 10/1999 | Satoh | G06F 17/2217 707/999.004 |
| 5,964,258 A * | 10/1999 | Schoenbauer | A47J 37/1223 141/231 |
| 6,009,794 A | 1/2000 | Casey et al. | |
| 6,022,473 A | 2/2000 | Mickelson | |
| 6,041,802 A * | 3/2000 | Nelson | A47J 37/1271 137/14 |
| 6,168,723 B1 * | 1/2001 | Moody | B01D 17/005 210/167.31 |
| 6,202,543 B1 | 3/2001 | Moya et al. | |
| 6,207,051 B1 | 3/2001 | Anderson et al. | |
| 6,234,063 B1 * | 5/2001 | Evers | G07F 17/0078 99/323.7 |
| 6,235,210 B1 | 5/2001 | Saksena | |
| 6,254,790 B1 | 7/2001 | King | |
| 6,306,294 B1 | 10/2001 | Blair | |
| 6,330,852 B1 | 12/2001 | Williams | |
| 6,372,129 B1 * | 4/2002 | Moody | B01D 17/005 210/181 |
| 6,557,570 B1 | 5/2003 | Gierbolini et al. | |
| 6,715,514 B2 * | 4/2004 | Parker, III | G06Q 10/08 141/1 |
| 6,783,685 B2 | 8/2004 | Hwang | |
| 6,792,983 B2 * | 9/2004 | Allora | A47J 37/1223 141/18 |
| 6,981,531 B1 * | 1/2006 | Palazzo | B08B 9/08 141/198 |
| 7,354,511 B2 | 4/2008 | Becker | |
| 7,377,210 B1 | 5/2008 | Franco | |
| 7,566,468 B1 * | 7/2009 | Oberlin | C11B 3/008 426/330.6 |
| 7,735,526 B2 * | 6/2010 | Palazzo | A47J 37/1285 141/1 |
| 7,938,959 B1 * | 5/2011 | Inman | A47J 37/1233 137/206 |
| 7,993,530 B2 | 8/2011 | Horne | |
| 8,111,979 B2 * | 2/2012 | Feinberg | A47J 37/1223 392/463 |
| 8,153,001 B2 | 4/2012 | Peters | |
| 8,246,824 B2 * | 8/2012 | Larin | B65F 1/02 210/237 |
| 8,474,662 B2 * | 7/2013 | Palazzo | A47J 37/0871 211/59.2 |
| 8,497,691 B2 * | 7/2013 | Behle | A47J 37/1223 324/663 |
| 8,627,762 B2 * | 1/2014 | Gvili | A47J 37/1233 426/417 |
| 8,831,413 B2 | 9/2014 | Arnold et al. | |
| D721,533 S * | 1/2015 | Coco | D7/368 |
| 8,926,837 B1 | 1/2015 | Shumate | |
| 8,992,773 B2 | 3/2015 | Marheine | |
| 9,156,390 B2 * | 10/2015 | Allora | A47J 37/1271 |
| 9,392,907 B2 * | 7/2016 | Allora | A47J 37/1271 |
| 9,481,562 B2 * | 11/2016 | Vandersteen | G07F 11/002 |
| 9,512,383 B2 * | 12/2016 | Palazzo | C11B 13/00 |
| 9,528,510 B2 * | 12/2016 | Tiszai | A47J 37/1223 |
| 2002/0035931 A1 | 3/2002 | Tschopp et al. | |
| 2003/0192621 A1 * | 10/2003 | Allora | A47J 37/1223 141/98 |
| 2004/0020555 A1 * | 2/2004 | Sus | B65B 43/305 141/82 |
| 2004/0058043 A1 | 3/2004 | More | |
| 2004/0159243 A1 | 8/2004 | Theodos | |
| 2006/0065582 A1 | 3/2006 | Bell | |
| 2007/0227597 A1 * | 10/2007 | Palazzo | A47J 37/1285 137/565.01 |
| 2007/0266679 A1 | 11/2007 | Horne | |

(56) References Cited

U.S. PATENT DOCUMENTS

| | | | | |
|---|---|---|---|---|
| 2008/0196596 A1* | 8/2008 | Forrest | ............... | A47J 37/1219 99/408 |
| 2008/0213445 A1* | 9/2008 | Feinberg | ............ | A47J 37/1223 426/417 |
| 2008/0213446 A1* | 9/2008 | Feinberg | ............ | A47J 37/1266 426/417 |
| 2008/0277412 A1* | 11/2008 | Palazzo | ............... | A47J 37/1223 222/63 |
| 2009/0039004 A1* | 2/2009 | Andersen | ............ | A47J 37/1223 210/167.28 |
| 2009/0078659 A1 | 3/2009 | Whitlock et al. | | |
| 2010/0116345 A1* | 5/2010 | Florkey | ............... | A47J 37/1223 137/1 |
| 2010/0201528 A1* | 8/2010 | Bruinsma | ........... | A47J 37/1266 340/584 |
| 2010/0326288 A1* | 12/2010 | Tiszai | ................ | A47J 37/1223 99/355 |
| 2011/0186592 A1* | 8/2011 | Palazzo | ............... | A47J 37/0871 222/1 |
| 2011/0238310 A1* | 9/2011 | Estrellado | ............... | A47J 36/32 702/1 |
| 2011/0276164 A1* | 11/2011 | Bourg, Jr. | ............ | G05B 13/042 700/104 |
| 2011/0276169 A1* | 11/2011 | Bourg, Jr. | ........ | G05B 19/41865 700/109 |
| 2012/0030993 A1* | 2/2012 | Crosier | ..................... | C10L 1/02 44/308 |
| 2013/0087508 A1* | 4/2013 | Haddock | ............... | A47J 37/1223 210/741 |
| 2013/0183421 A1* | 7/2013 | Evraets | ................ | B01D 29/09 426/417 |
| 2013/0193044 A1* | 8/2013 | Coco | .................... | A47J 37/1223 210/167.28 |
| 2013/0193084 A1 | 8/2013 | Vogt | | |
| 2013/0278276 A1* | 10/2013 | Behle | .................. | A47J 37/1223 324/663 |
| 2014/0004234 A1* | 1/2014 | Mosteller | ............ | A47J 37/1266 426/231 |
| 2014/0356499 A1* | 12/2014 | Palazzo | ................... | C11B 13/00 426/417 |
| 2015/0101966 A1* | 4/2015 | Coco | .................... | A47J 37/1223 210/86 |
| 2015/0101972 A1* | 4/2015 | Coco | .................... | A47J 37/1223 210/167.28 |
| 2015/0374173 A1* | 12/2015 | McGhee | ............... | G01N 33/03 99/330 |
| 2016/0033463 A1* | 2/2016 | Robertson | ................ | A47J 37/12 426/231 |
| 2017/0030880 A1* | 2/2017 | Behle | .................. | A47J 37/1223 |

* cited by examiner

COOKING OIL STORAGE AND FILTRATION SYSTEM

CROSS-REFERENCE TO RELATED APPLICATIONS

This application in a continuation-in-part application of U.S. patent application Ser. No. 14/273,899 filed May 9, 2014 entitled Cooling Oil Storage and Filtration System which is a continuation-in-part of application Ser. No. 13/745,420 filed Jan. 18, 2013 entitled Cooking Oil Storage and Filtration System which claims the benefit of 61/588,144 filed Jan. 18, 2012 all of which are hereby incorporated by reference in their entirety.

BACKGROUND OF THE INVENTION

Field of the Invention

The present disclosure relates to a system for storing and containing cooking oils and greases and, in particular, concerns a system that allows for filtration and storage of used cooking grease and oil in a single container.

Description of the Related Art

Cooking in oil is a very common form of cooking in the restaurant trade. All fried food, including French fries and other staples of diners and fast food restaurants, are typically cooked in a fryer which contains heated cooking oil. As the oil is used, food particles often become entrained in the oil. These particles can spoil the oil which can make the used oil unsanitary and can make later-cooked items taste bad. Consequently, cooking oil must periodically be cleaned (e.g., filtered) or replaced to avoid spoiling the oil and adversely affecting the taste of food cooked in the oil.

Generally, in larger restaurants, used oil is contained in a large, movable container. Used cooking oil unfit for reuse in the fryers often must be transported off of the site of the restaurant. Used cooking oil can be a valuable component suitable for recycling or reuse into other applications (e.g., for use in biodiesel engines). Further, cooking oil typically cannot be disposed of in the sewer system. Not only can the oil be harmful to the environment, it can also clog the sewer system.

However, one difficulty that restaurants experience is that there is a limited amount of space available for both filtration systems and storage containers for used and new cooking oil. Restaurant kitchens are often crowded spaces that require work surfaces and storage surfaces for use in the preparation and storage of the food being served in the restaurant. As such, many restaurants do not have sufficient space to efficiently handle filtration systems and storage systems in addition to deep fryers. Storing filtration systems and storage systems outside of the kitchen can lead to sanitation issues when those systems are transported into the kitchen.

Additionally, the filtration and storage of used cooking oil can be a messy and difficult process to complete within the confines of a restaurant kitchen. In many cases, filtering and disposing of or reusing the oil involves moving and/or lifting containers of oil. Moving and lifting of the containers can lead to spills of the oil. Oil spills in the kitchen can be both messy and dangerous, as there is a risk that restaurant employees and others could slip and fall. Additionally, moving and lifting the containers of oil can lead to injury due to the sheer weight of the oil.

A further difficulty is keeping track of the oil and knowing when to have the oil changed and filtered. Typically, oil can be used for a limited period of time. Once the oil is used for an excessive period of time, the oil can become tainted which affects the quality of the food being produced with the oil. Existing oil filtration and storage systems do not adequately keep track of the amount of oil that has been filtered or used nor whether the oil has been changed recently. These systems also do not advise the collection service when the oil needs to be collected, consequently, used oil may remain uncollected which can clutter up limited space in restaurants and present a tempting target for theft.

Further, kitchen personnel are often not full-time employees who are continuously monitoring the oil that is being used and consumed. Additionally, kitchen personnel are also often not well trained to detect when oil should be replaced. Consequently, there is an on-going problem of keeping track of the status of the oil.

Yet a further difficulty that occurs is that since the used cooking oil is a valuable commodity, it is the subject of theft. Typically, a restaurant contracts with an oil collection service to removed used cooking oil. However, unscrupulous oil collectors can show up at the restaurant purporting to be the oil collection service and take the existing used oil. The kitchen staff may not be able to detect whether the oil collectors are from the contracted service and the contracted service is not on the site of the restaurant so the contracted service has no reason to know that the oil is either ready to collection or that others are attempting to collect the oil illegally.

Hence, there is a need for a cooking oil filtration and storage system that more efficiently uses the space available in a restaurant kitchen and also allows for better management of the filtration storage and replacement of used oil. To this end, there is a need for a system that can extract oil from the deep fryer for both storage and filtration purposes while fitting within the confines of a restaurant kitchen and can intelligently monitor the status of the oil and communicate this status to others.

SUMMARY OF THE INVENTION

In one implementation, the aforementioned needs are satisfied by a cooking oil storage and filtration system for use in a kitchen with a cooking oil reservoir and a filtering pan, the filtration system comprising a used oil storage tank for storing used oil; an oil dispensing and removing system for dispensing and removing oil from an external location; a filtration system for filtering used oil; a pump and valve system that removes oil via the oil inlet/outlet system from an external source and is adapted to provide the oil to the filtration system and wherein the pump and valve system is further adapted to either provide the oil to the used oil storage tank or return the oil via the oil inlet/outlet system to the external source; and a control system with a user interface that permits an operator to control the operation of the system.

BRIEF DESCRIPTION OF THE DRAWINGS

Various embodiments are depicted in the accompanying drawings for illustrative purposes, and should in no way be interpreted as limiting the scope of the disclosure, in which like reference characters denote corresponding features consistently throughout similar embodiments.

DETAILED DESCRIPTION OF THE PREFERRED EMBODIMENT

Figure 1A:
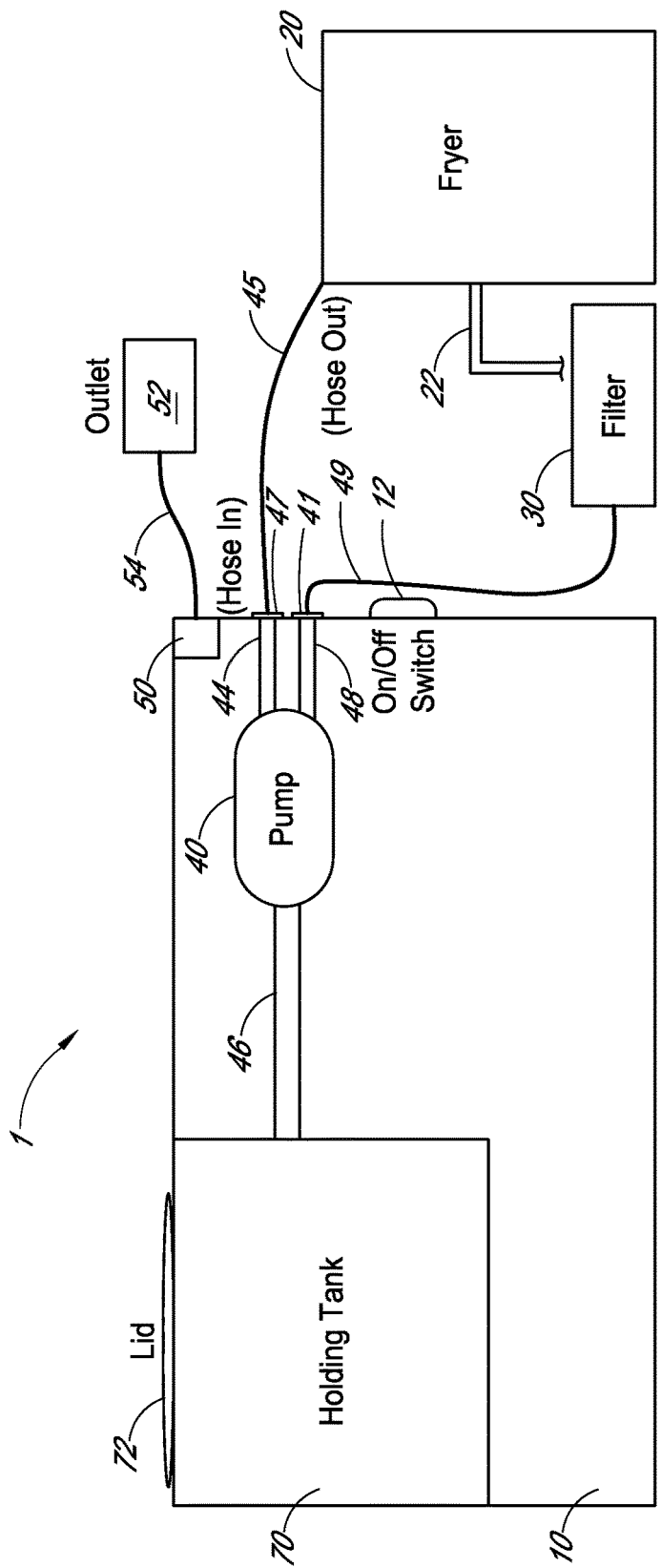
FIG. 1A is a side schematic view of a system for pumping and storing cooking oils.
Figure 1B:
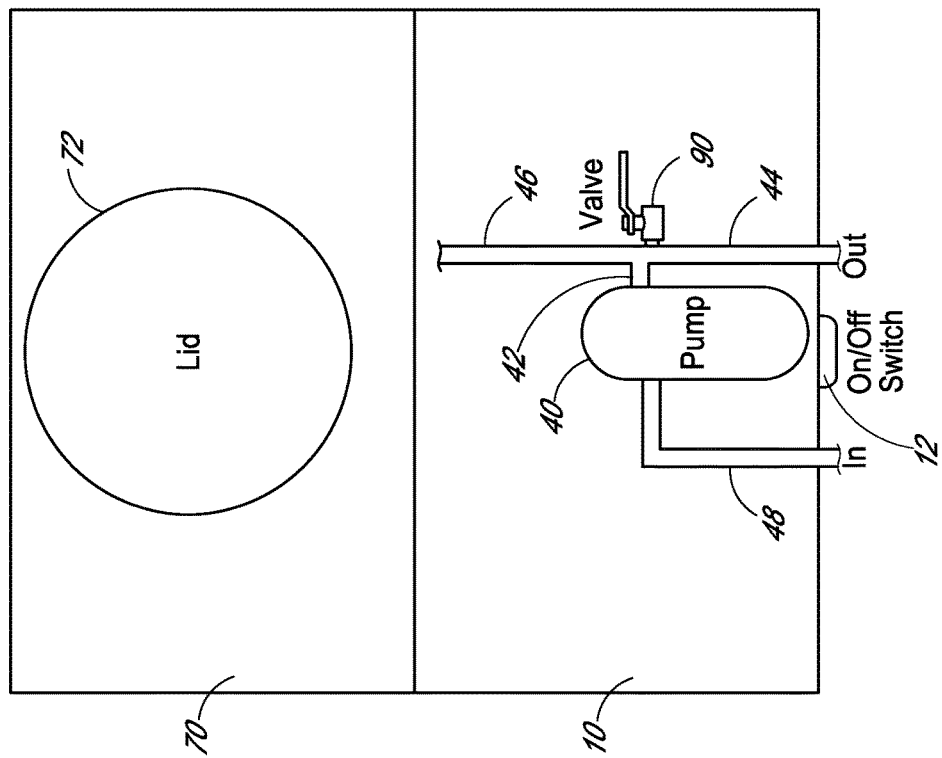
FIG. 1B is a top schematic view of the system of FIG. 1A.

Reference will not be made to the drawings wherein like number refer to like parts throughout. FIGS. 1A and 1B illustrate an embodiment of a cooking oil storage and filtration system 1. The system 1 is adapted to be used in conjunction with a cooking oil reservoir 20 (e.g., a deep fryer) that has a holding tank containing used cooking oil. The size or number of the cooking oil reservoirs 20 and the consequent size and capability of the system 1 will vary depending upon the implementation without departing from either the scope or the teachings of the present disclosure.

As illustrated, the system 1 can include a housing 10 defining an internal volume. The housing 10 can be sized and dimensioned to fit underneath a counter in a commercial kitchen. For example, the housing can measure 32" tall by 18" wide by 28" deep. In some embodiments, the housing 10 is sized and dimensioned to fit in another part of the kitchen (e.g., in a storage closet). The housing 10 can include one or more power inputs 50 such as, for example, an electrical connection 50. The electrical connection 50 can be a male or female plug adapted to receive a female or male electrical plug. In some embodiments, an electrical extension cord 54 can be used connect the electrical connection 50 to an electrical outlet 52 or other source of electricity.

The system can include a filtering pan 30 of a type known in the industry. The filtering pan 30 can be mounted onto or into the housing 10 or can be separate from the housing 10. In some embodiments, the filtering pan 30 is installed within the housing 10. In some embodiments, the filtering pan 30 is adapted to be used separate from the housing 10. In some such embodiments, the filtering pan 30 can be dimensioned to be stored within the housing 10 when the system 1 is not in use.

The system 1 can include a pump 40. The pump 40 can be used to extract oil from the cooking oil reservoir 20 and/or from the filtering pan 30. In embodiments, the pump 40 can be a 5 horsepower pump or other appropriate pump 40 known in the art. The pump 40 can be adapted to extract oil from the cooking oil reservoir 20 into filtering pan 30. In some configurations, the pump 40 is adapted to extract oil from the cooking oil reservoir 20 and/or the filtering pan 30 into the pump 40.

The system 1 can include a pump inlet 48 connected to the pump 40. The pump inlet 48 can be adapted to facilitate fluid communication with the interior of the pump 40. The pump inlet 48 can, in some configurations, be accessed via an intake port 41 from outside of the housing 10. In some embodiments, the intake port 41 is connected to an intake hose 49 or other fluid conduit. The intake hose 49 can be removably connected to the filtering pan 30. In some embodiments, the intake hose 49 provides fluid communication between the pump inlet 48 and the filtering pan 30. In some embodiments, the intake hose 49 can be used to create fluid communication between the pump inlet 48 and the cooking oil reservoir 20. The cooking oil reservoir 20 can include a drain 22. The drain 22 can be used to transfer oil or other fluids from the cooking oil reservoir 20 into the filtering pan 30. In some embodiments, the intake hose 49 is adapted to mate with the drain 22 and provide fluid communication between the cooking oil reservoir 20 and the pump inlet 48.

In some embodiments, the system 1 includes an pump outlet 42 connected to the pump 40. The pump outlet 42 can be adapted to facilitate fluid communication with the interior of the pump 40. In some embodiments, a valve 90 is connected to the pump outlet 42. The valve 90 can be adapted to facilitate selective communication between the pump outlet 42 and one or more outlet channels. In some embodiments, the valve 90 is a three-way valve (e.g., a three-way ball valve). The outlet channels of the system 1 can include a storing channel 46 and/or a reuse channel 44.

The valve 90 can be adapted to transition between a reuse orientation and a storing orientation. When in the reuse orientation, the valve 90 can provide fluid communication between the pump outlet 42 and the reuse channel 44. In some embodiments, the system 1 includes an outlet port 47 that can be accessed from outside of the housing 10. The system 1 can include an outlet hose 45 adapted to connect to the outlet port 47. In some embodiments, the outlet hose 45 can facilitate fluid communication between the outlet port 47 and the cooking oil reservoir 20. In some such embodiments, cooking oil or other fluids can be pumped from the cooking oil reservoir 20 or from the filter 30, into the pump 40 and back into the cooking oil reservoir 20.

When in the storing orientation, the valve 90 can provide fluid communication between the pump outlet 42 and a storage tank 70. The storage tank 70 can be a sub-compartment within the housing 10. In some embodiments, the storage tank 70 is a separate volume adapted to mount into the housing 10. The storage tank 70 can have a lid 72 configured to allow access to the interior of the storage tank 70 from outside the storage tank 70 and/or the housing 10.

The housing 10 can include a pump actuator 12. The pump actuator 12 can be adapted to transition between an activation position and a deactivation position. When in the activation position, the pump actuator 12 can cause the pump to power on. When in the deactivation position, the pump actuator 12 can prevent the pump from running. In some embodiments, the pump actuator 12 is a button that can be depressed to transition the pump actuator 12 to the activation position. In some such configurations, the pump actuator 12 is biased such that it will return to a non-depressed position and deactivate the pump 40 when the depressing force (e.g., a finger of the user of the system 100) is removed from the button. In some embodiments, the actuator 12 can be a rotatable knob that is biased to the deactivation position.

Figure 3:
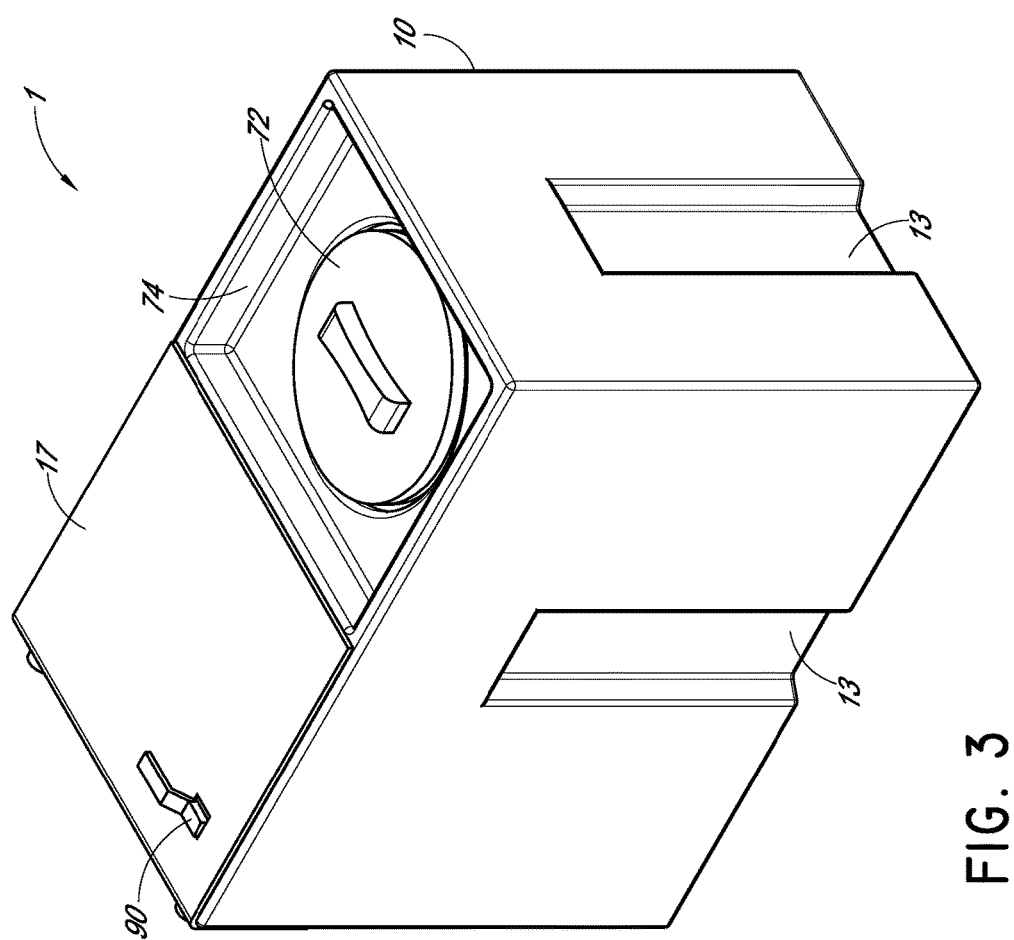
FIG. 3 is a rear perspective view of the system of FIG. 1A.
Figure 4:
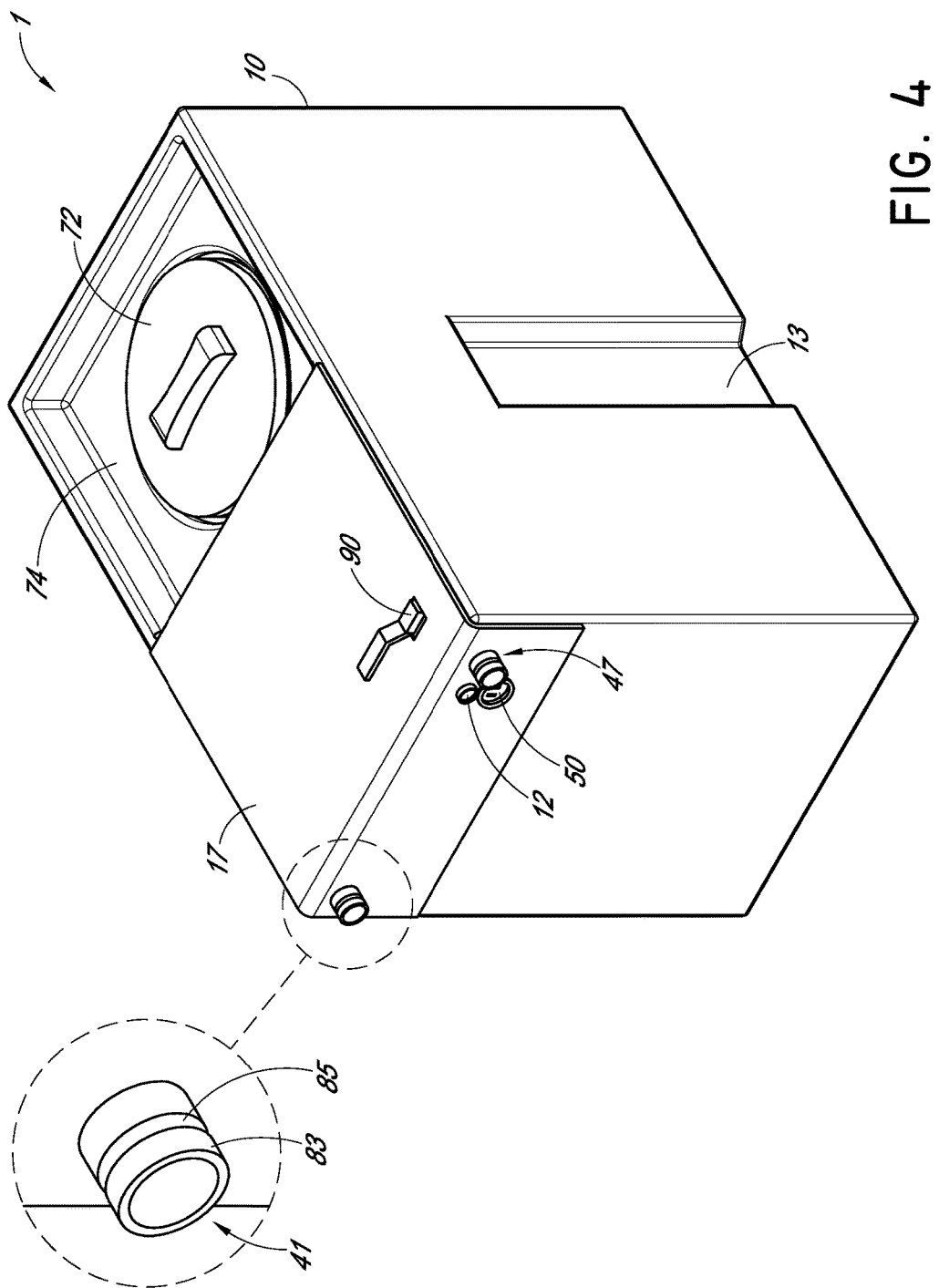
FIG. 4 is a front perspective view of the system of FIG. 1A.

FIGS. 3 and 4 illustrate an embodiment of the system 1 which includes a pump interface 17. The pump interface 17 can be a piece of material shaped to cover at least a portion of the top of the housing 10. In some embodiments, the pump interface 17 covers at least a portion of at least on side of the housing 10. For example, the pump interface 17 illustrated in FIGS. 3 and 4 covers a portion of the top of the housing 10 and a portion of one side of the housing 10. The pump interface 17 can include one or more cut out portions adapted to match one or more features of the housing 10 and the system 1. For example, the pump interface 17 can include a cutout for each of the outlet port 47 and the intake port 41. In some embodiments, the pump interface 17 can be constructed of a metallic material (e.g., tin, aluminum, steel, or another suitable metal or mix of metals). In some embodiments, the pump interface 17 is constructed of a plastic or some other suitable polymeric material.

In some embodiments, as illustrated in FIGS. 3 and 4, the housing 10 can include one or more channel features 13. For example, the housing 10 can have one or more channel features 13 on each side of the housing 10. In some embodiments, the channel features 13 extend from the bottom of the housing 10 to approximately half way up the side of the housing 10. In some embodiments, the channel features 13 extend from the bottom of the housing to approximately three quarters up the side of the housing 10. Many variations of the length and width of the channel features 13 are possible. In some embodiments, the housing 10 has one channel feature 13 on each of three sides of the housing 10. The channel feature 13 can help to stabilize the sides of the housing 10 and inhibit collapse and/or buckling of the sides of the housing 10. Furthermore, the housing 10 can include an indentation 74 on the top of the housing 10. In some embodiments, the indentation 74 corresponds with the top of the storage tank 70. In some embodiments, the indentation 74 is larger than or smaller than the top of the storage tank 70.

Figure 5:
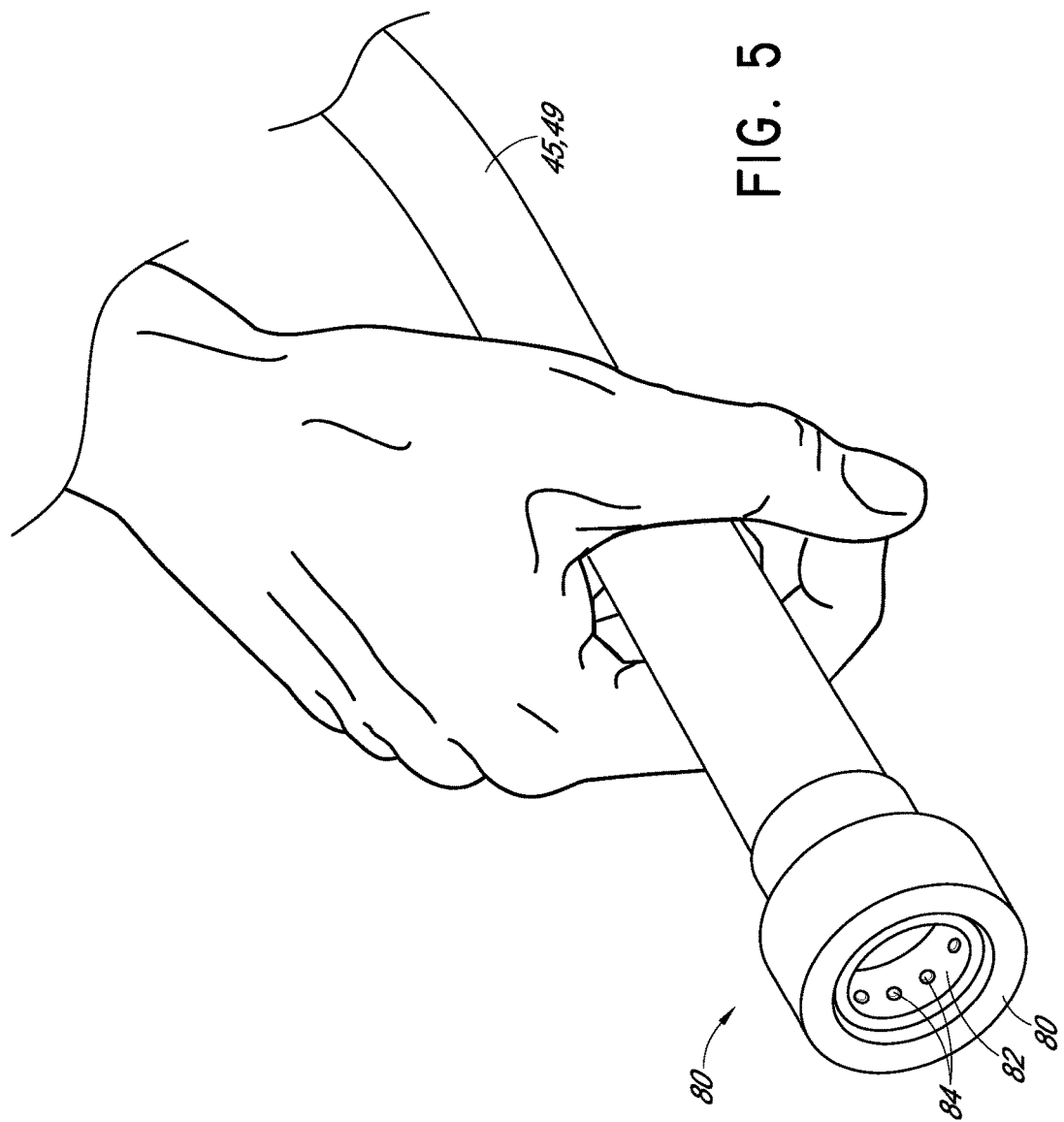
FIG. 5 is a close up perspective of a hose connector.

As illustrated in FIG. 5, the outlet hose 45 and/or the intake hose 49 can include a quick connect feature 80. For example, the quick connect feature 80 can include a connection portion 82. The connection portion 82 can define a generally cylindrical cavity with an axial centerline. In some embodiments, the cavity has another shape, such as, for example, an oval shape, rectangular shape, or any other shape or combination of shape. In some embodiments, the connection portion 82 includes one or more engagement features 84 on the inside of the cavity. The one or more engagement features 84 can be, for example, a circumferential series of biased spheres configured to flex outwardly in the radial direction away from the axial centerline of the cavity in reaction to contact force. In some embodiments, the engagement features 84 can be one or more flexible tabs extending from the inner wall of the cylindrical cavity toward the axial centerline of the cavity. The intake port 41 and/or the outlet port 47 can include an extended feature 83. The extended feature 83 can be shaped to match the inner walls of the cavity in the quick connect feature 80. In some embodiments, the extended feature 83 includes one or more connecting features 85 configured to connect with the engagement feature 84. For example, the connecting feature 85 can be an annular groove configured to releasably engage with one or more spherical engagement feature 84. In some embodiments, the quick connect features 80 on the intake hose 49 and outlet hose 45 can be shaped differently from each other to match unique shapes on the connecting features 85 of the intake port 41 and outlet port 47. In some such embodiments, inadvertent connection between, for example, the quick connect feature 80 of the intake hose 49 with the connecting feature 85 on the reuse port can be avoided.

Figure 6:
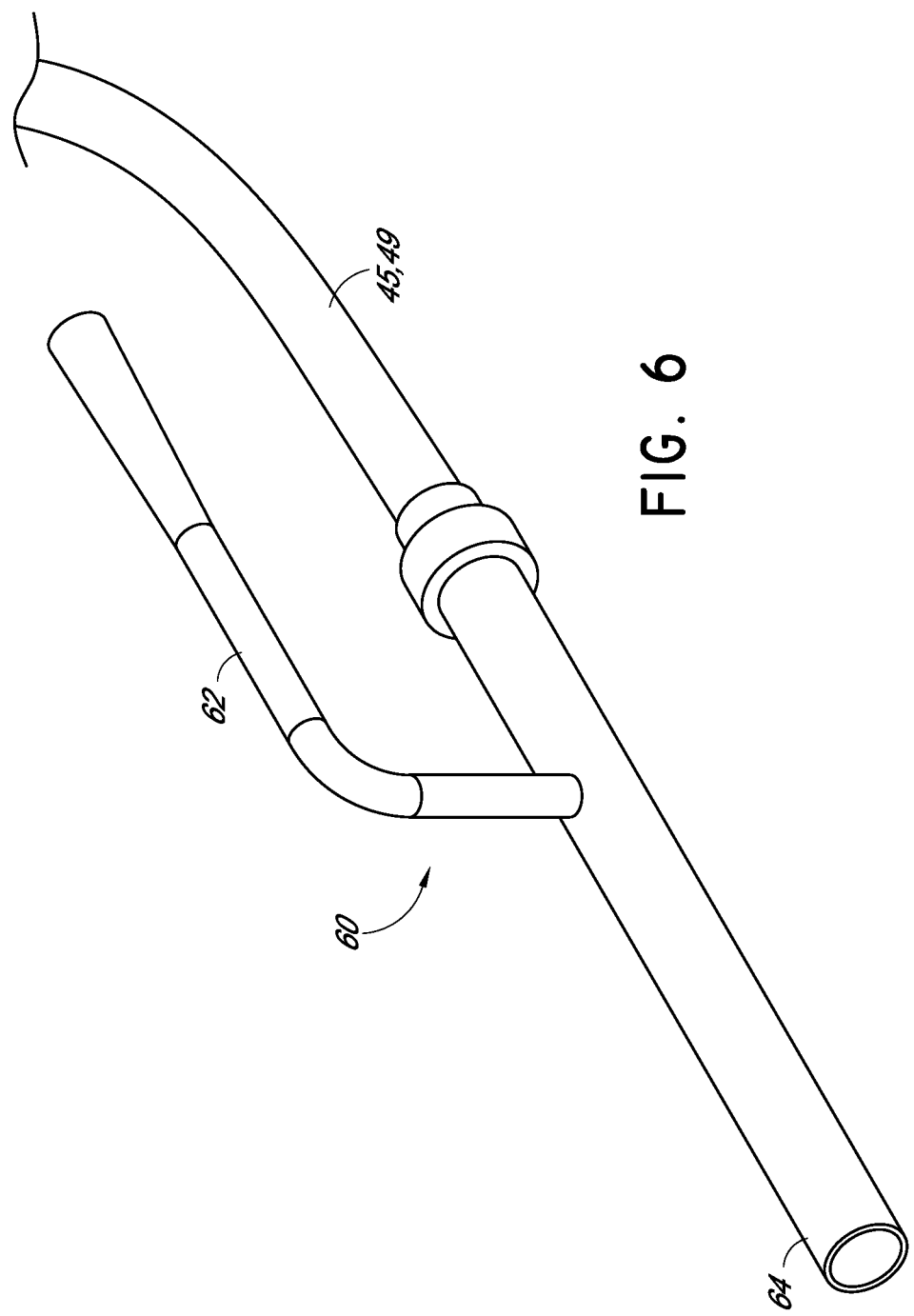
FIG. 6 is a close up perspective view of a spout of a hose.

FIG. 6 illustrates an embodiment of an intake or outlet hose 45,49 that includes a handle member 60. The handle member 60 can be located on the end of the intake and/or outlet hose 45,49 opposite the quick connect feature 80 of the hose 45,49. In some embodiments, the handle member 60 includes a spout 64. In some embodiments, the spout 64 can have nozzle features to accelerate the flow of cooking oil or other fluid out from the spout 64. In some embodiments, the handle member 60 includes a handle 62. The handle 62 can assist the user of the system 1 in controlling the direction and location of the spout 64.

In some embodiments, the housing 10 can include one or more transport features on the bottom of the housing 10. For example, the housing 10 can have attached wheels that allow for easier transport of the housing 10 from one location to another. In some embodiments, the housing 10 includes one or more transport features adapted to engage with a hand truck, forklift, or other transport tool.

A method of using the system 1 can include using the drain 22 to transfer cooking oil from the cooking oil reservoir 20 to the filtering pan 30. The method can further include using the filtering pan 30 to filter at least some particulates from the transferred cooking oil. The user of the system can then decide whether to return the filtered cooking oil to the cooking oil reservoir 20 or to the storage tank 70. Upon deciding to transfer the filtered cooking oil to the storage tank 70, the user of the system 1 can insert the spout 64 or other end feature of the intake hose 49 into the filtering pan 30. In some configurations, the user can then transition the valve 90 to the storing orientation. The user can also transition the pump actuator 12 to the activation position. Transition of the actuator 12 to the activation position can power the pump 40. In some embodiments, powering the pump 40 facilitates transfer of cooking oil from the filtering pan 30 to the storage tank 70 via the intake hose 49, the pump 40, the pump outlet 42, and the storing channel 46.

Figure 7:
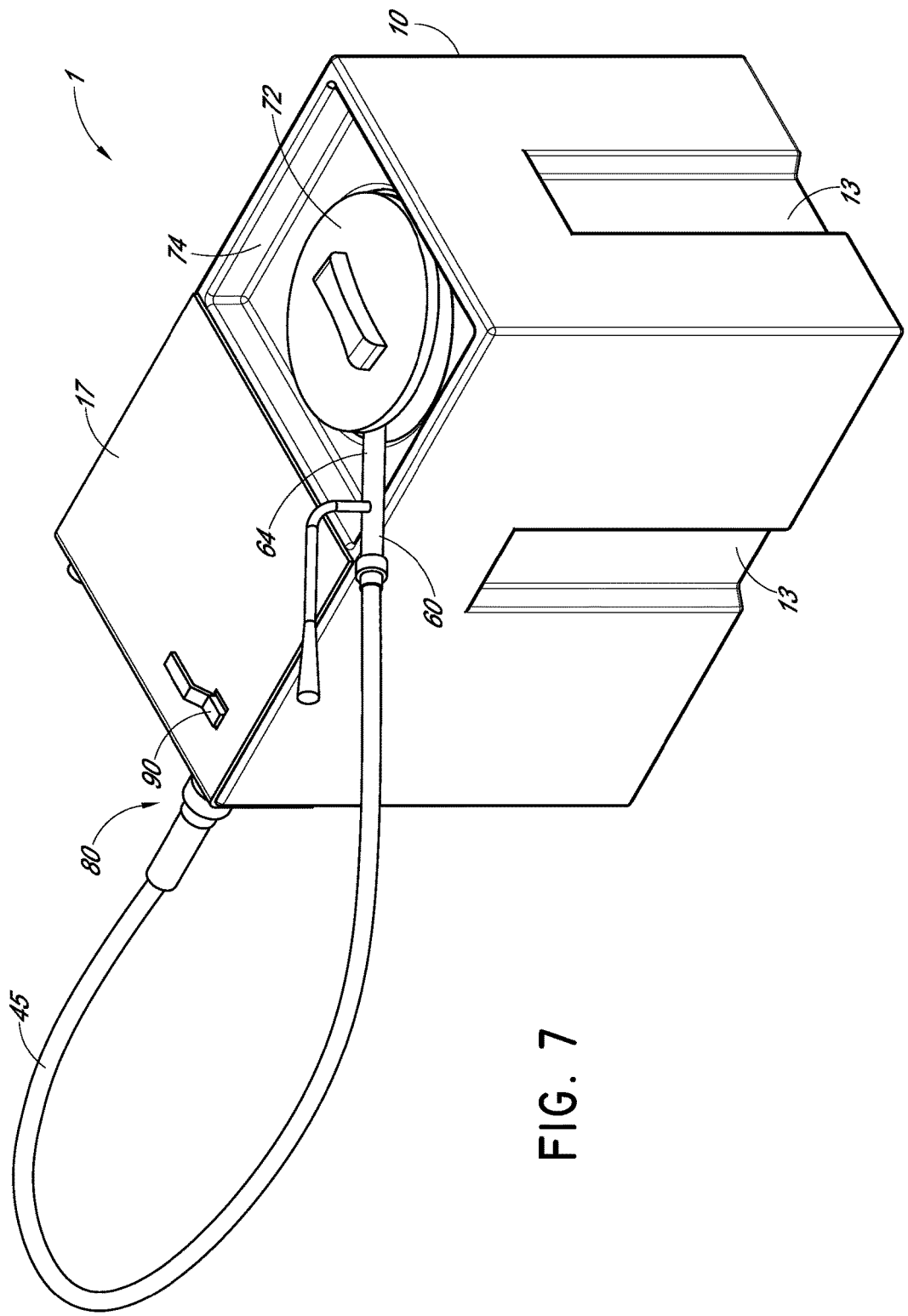
FIG. 7 is a rear perspective view of the system of FIG. 1A including a hose and spout.

In some embodiments, the user can transfer the used cooking oil from the filtering pan 30 to the storage tank 20 via the outlet hose 45. In some such embodiments, the valve 90 can be set to the reuse orientation and the spout 64 or other end feature of the outlet hose 45 can be inserted into the storage tank 70, as illustrated in FIG. 7. Upon transition of the actuator 12 to the activation position, the pump 40 can facilitate transfer of the cooking oil from the filtering pan 30 to the storage tank 70 via the intake hose 49, the pump 40, and the outlet hose 45.

On the other hand, the user can decide to transfer the filtered cooking oil back into the cooking oil reservoir 20. In some such scenarios, the user can insert the spout 64 or other end feature of the intake hose 49 into the filtering pan 30. Furthermore, the user can insert the spout 64 or other end feature of the outlet hose 45 into the cooking oil reservoir 20. The user can then transition the valve 90 to the reuse orientation. Upon transition of the actuator 12 to the activation position, the pump 40 can facilitate transfer of cooking oil from the filtering pan 30 to the cooking oil reservoir 20 via the intake hose 49, the pump 40, and the outlet hose 45.

In some embodiments, the user can transfer used cooking oil from the storage tank 70 to a disposal location. For example, the spout 64 or other end feature of the intake hose 49 can be inserted into the storage tank 70 via the lid 72 or some other access point. The spout 64 or other end feature of the outlet hose 45 can be inserted into the desired disposal location. Upon transition of the actuator 12 to the activation position, the pump 40 can facilitate transfer of cooking oil from the storage tank 70 to the disposal location via the intake hose 49, the pump 40, and the outlet hose 45.

Figure 2:
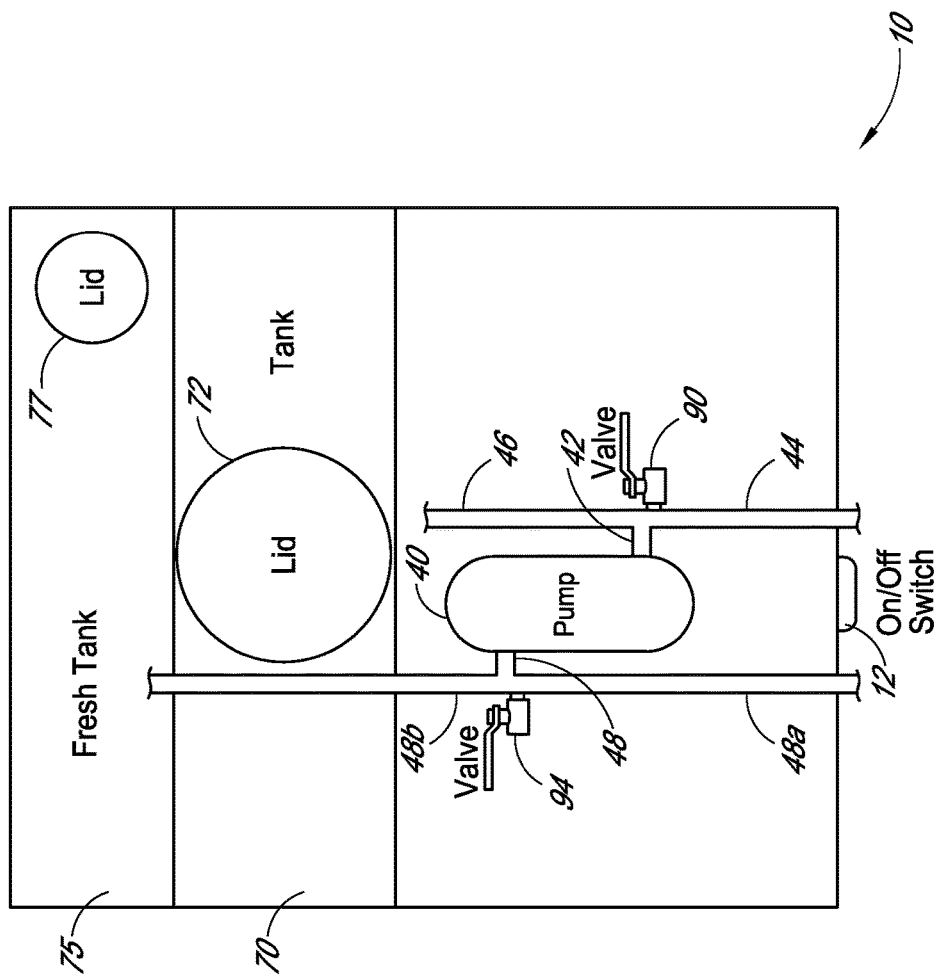
FIG. 2 is a top schematic view of an additional embodiment of a system for pumping and storing cooking oils.

FIG. 2 illustrates an embodiment of a system 2 for storing and/or transferring cooking oil that includes a second storage tank 75. In some embodiments, the second storage tank 75 can be used as a fresh oil holding tank. The system 2 can further include a second valve 94. In some embodiments, the second valve 94 is a three-way valve (e.g., a three-way ball valve). The second valve 94 can be configured to transition between a refresh orientation and a used orientation. For example, the second valve 94 can create fluid communication between the pump inlet 48 and the second storage tank 75 when the second valve 94 is in the refresh orientation. In some embodiments, the second valve 94 can create fluid communication between the intake port 41 and the pump inlet 48 when the second valve 94 is in the used orientation.

Figure 8:
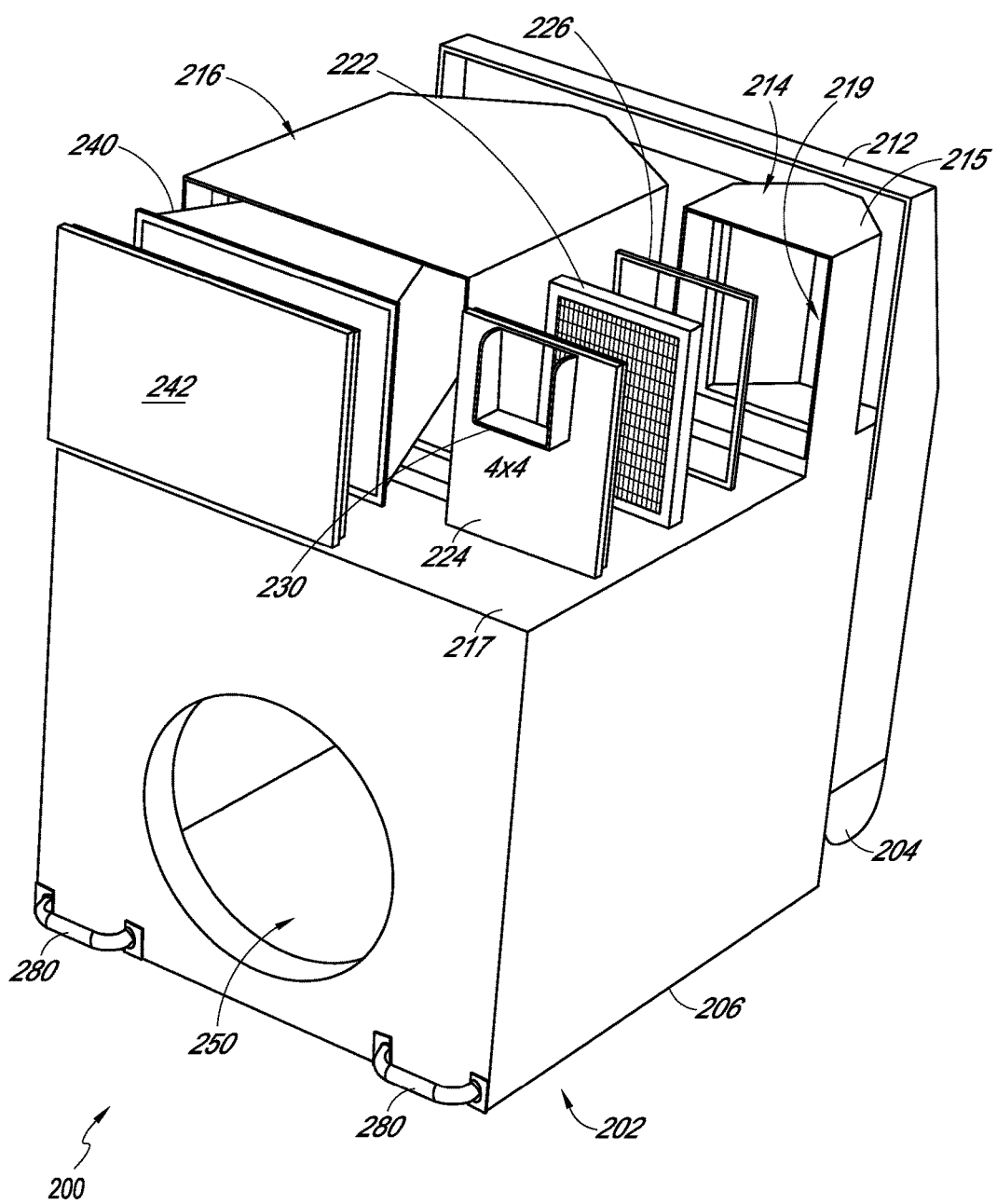
FIG. 8 is an exploded perspective view of another embodiment of the system for pumping and storing cooking oils.

FIG. 8 in another embodiment of a system 200 for filtering cooking oil and grease. The system 200 includes a holding tank 70, a pump 40, a filter 30 and a valve system and operates in generally the same manner as the system 2 described above. However, the housing for the system 200 is more integrated and additional filtration features are also present.

More specifically, as shown in FIG. 8, the system 200 includes a main housing 202 which defines a first receptacle 206 that is suited to receive holding tank 70 into which grease and cooking oil to be recycled is stored. The first receptacle 206 of the main housing 202 can also include the pump 40 and the various valve interconnections. The main housing is mounted on a chassis that is supported by caster wheels 204 so as to allow the housing to be moved from one location to another within a kitchen environment. As described previously, the system 200 can be sized so as to fit under a standard commercial kitchen counter so that the system 200 can be stored in a commercial kitchen without occupying limited kitchen floor space. Alternatively, the system 200 can be dimensioned to be larger to accommodate more capacity.

As is also shown, the main housing 202 may also include handles 280 to facilitate moving the receptacle from location to location in the kitchen. The first receptacle 206 may also include a large round access opening 250 that provides access to the reservoir 70 so as to permit the used grease or cooking oil to be pumped and for removal in the manner that was described above.

The main housing 202 is preferably rectangular and is sized so as to receive, in one non-limiting embodiment 78 gallons of used cooking oil or grease, however, it will be appreciated that the main housing and system 200 can be scaled depending upon need. The main housing 202 defines a shelf 212 that extends outward from the first receptacle 206 that is sized to receive a course filter 214 and a fine filter 216.

More specifically, the course filter 214 includes a housing 215 that is attached to a first side 217 of the first receptacle 206 so as to be somewhat elevated above the shelf 212. The bottom surface 219 of the course filter housing 215 has a drain hole 221 that is coupled to the pump system 70. The course filter 214 includes a course filter screen 222 that filters large particulate matter from used cooking grease and a support member 226. The course filter housing also includes a top surface 224 that defines an opening 230 which, in this embodiment, comprises a square 4×4 inch opening. The opening 230 preferably has raised lips 232. A user who is recycling or cleaning grease or cooking oil can insert a hose from a fryer 20 into the opening 230 and the cooking grease and oil are then filtered by the course filter screen 222.

The course filtered cooking oil or grease then falls or is sucked by the pump system 40 to the bottom of the course filter housing 215 where it is then pumped into a fine filter housing 216 that is positioned adjacent the course filter housing 215 on the shelf 212. The fine filter housing 216 is generally the same shape as the course filter housing 215 but is, however, larger as the filtration member positioned therein comprises a microfilter 240 that filters the cooking oil or grease more slowly and, thus, requires more volume.

In this embodiment, the pump 70 is attached to hoses and/or pipes such that cooking oil or grease from the bottom of the course filter housing 215 is then pumped into the top of the fine filter housing 216 so as to percolate through the fine filter 240 into the bottom of the fine filter housing 216. The finely filtered grease can then either be pumped back to the frying via a hose out 45 (See, FIG. 1A) or into a storage receptacle within the main housing 206. The fine filter housing 240 also includes a cap 242 so as to prevent oil or grease from spilling out of the housing 240.

Figure 9:
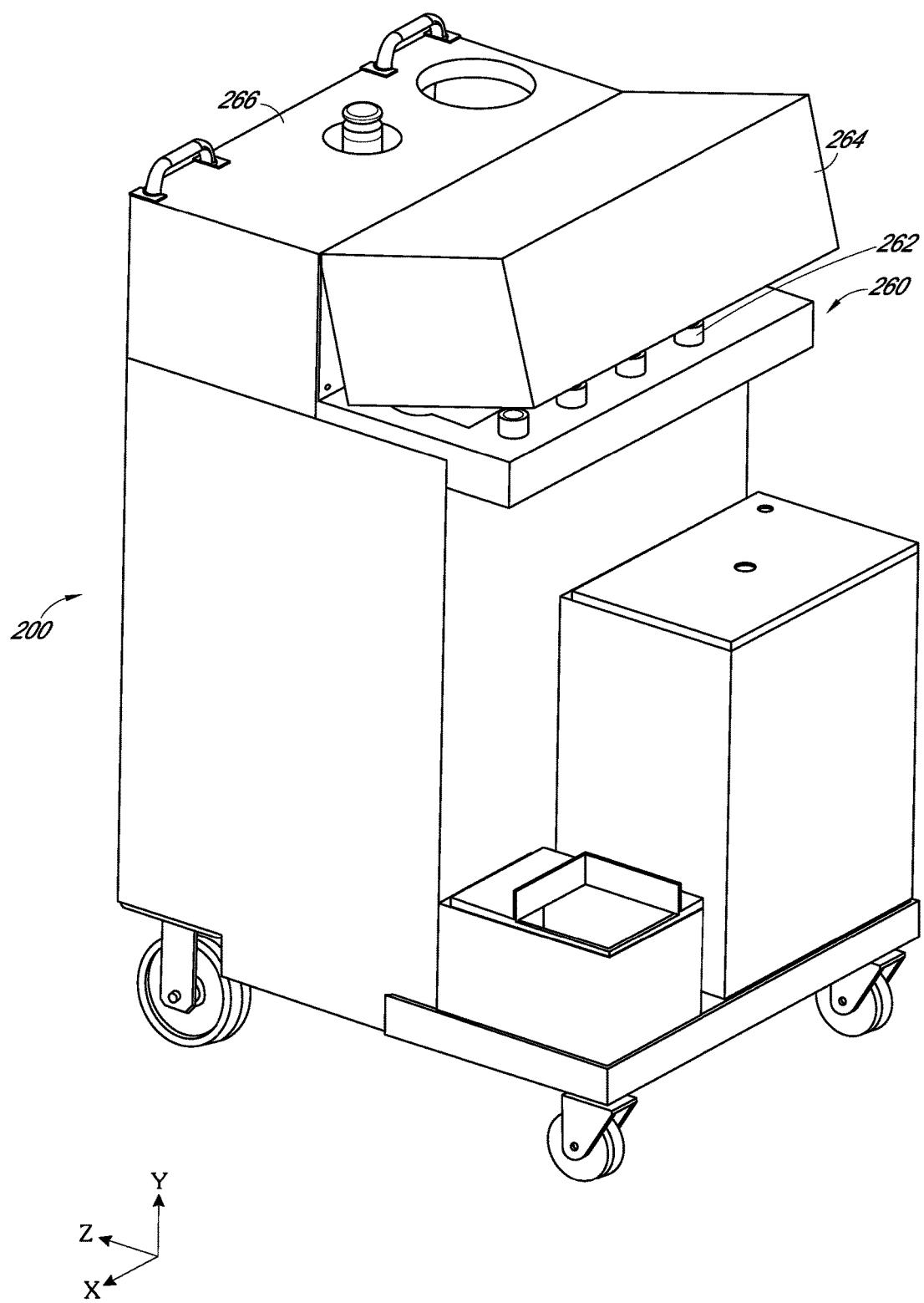
FIG. 9 is a perspective view of another embodiment of a system for pumping and storing cooking oils.

FIG. 9 is another embodiment of filter system 200' that is similar to the filter system 200 described in conjunction with FIG. 7. The system 200' also includes a main housing 202 that is mounted on a chassis and wheels 204 so as to be movable. The system 200' also includes a shelf 212 that includes a course filter housing 215 and a fine filter housing 216 which operate in the same manner as described above. In this embodiment, the first receptacle 206 may include a control panel shelf 260 that is positioned underneath a hinged cover 262. The control panel shelf 260 may include controls 264 that permit the user to pump and filter the oil in the manner described above. The control panel shelf 260 is preferably located adjacent the upper surface 266 of the first receptacle 206 so as to be readily accessible to a user.

The first receptacle 206 may include two openings at the upper surface 266, one for permitting access to the reservoir 70 for removing stored grease and one, possibly, for accessing a secondary reservoir for storing cleaned or unused grease or cooking oil. It will be appreciated that he configuration of the housing 206 and the reservoirs contained therein can vary without departing from the spirit if the present invention. In one implementation, the housing can house a 58 gallon or cubic inch reservoir. The grease can also be pumped into a holding tank in one implementation.

Figure 10A:
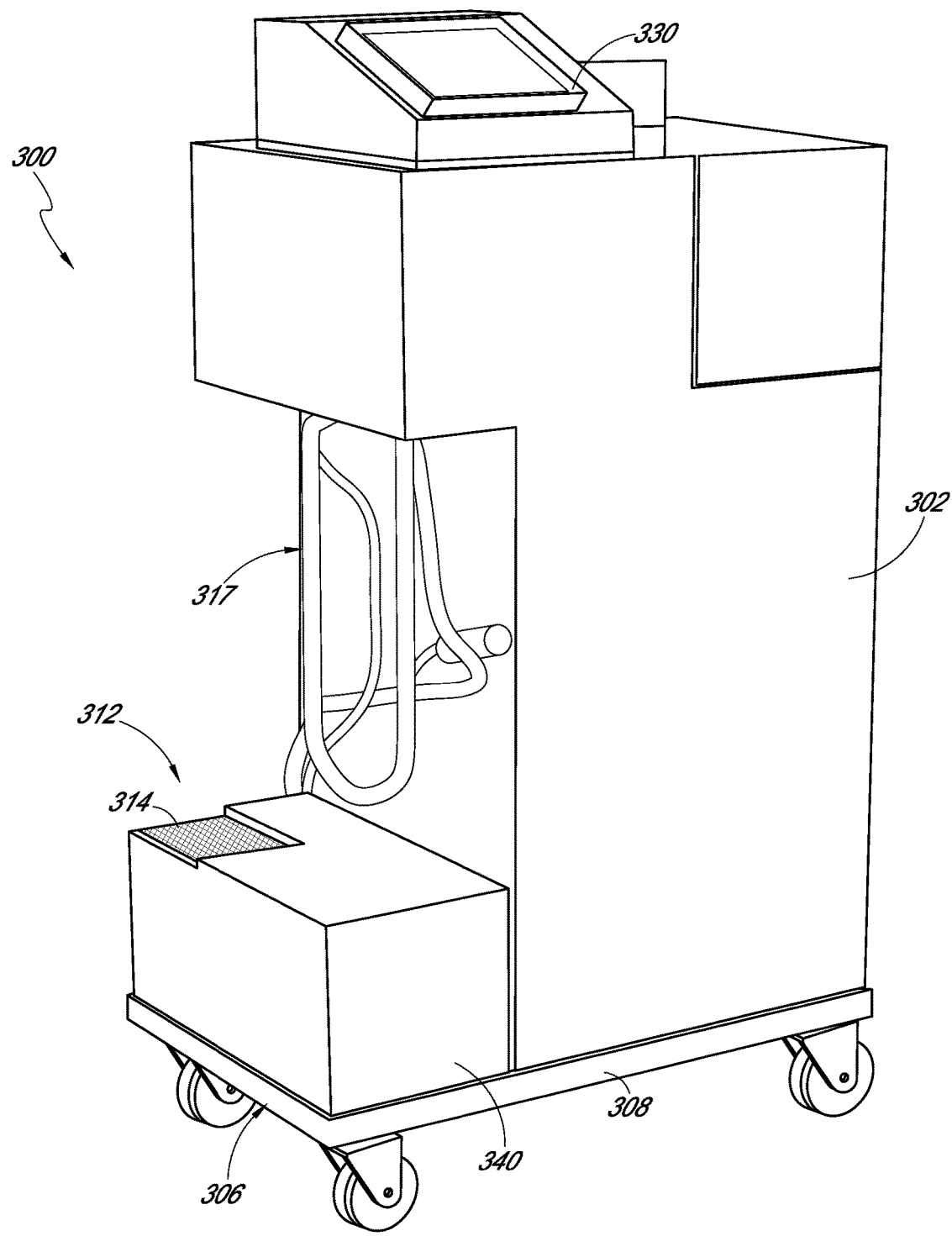
FIGS. 10A and 10B are perspective views of another embodiment of a system for pumping and storing cooking oils.
Figure 10B:
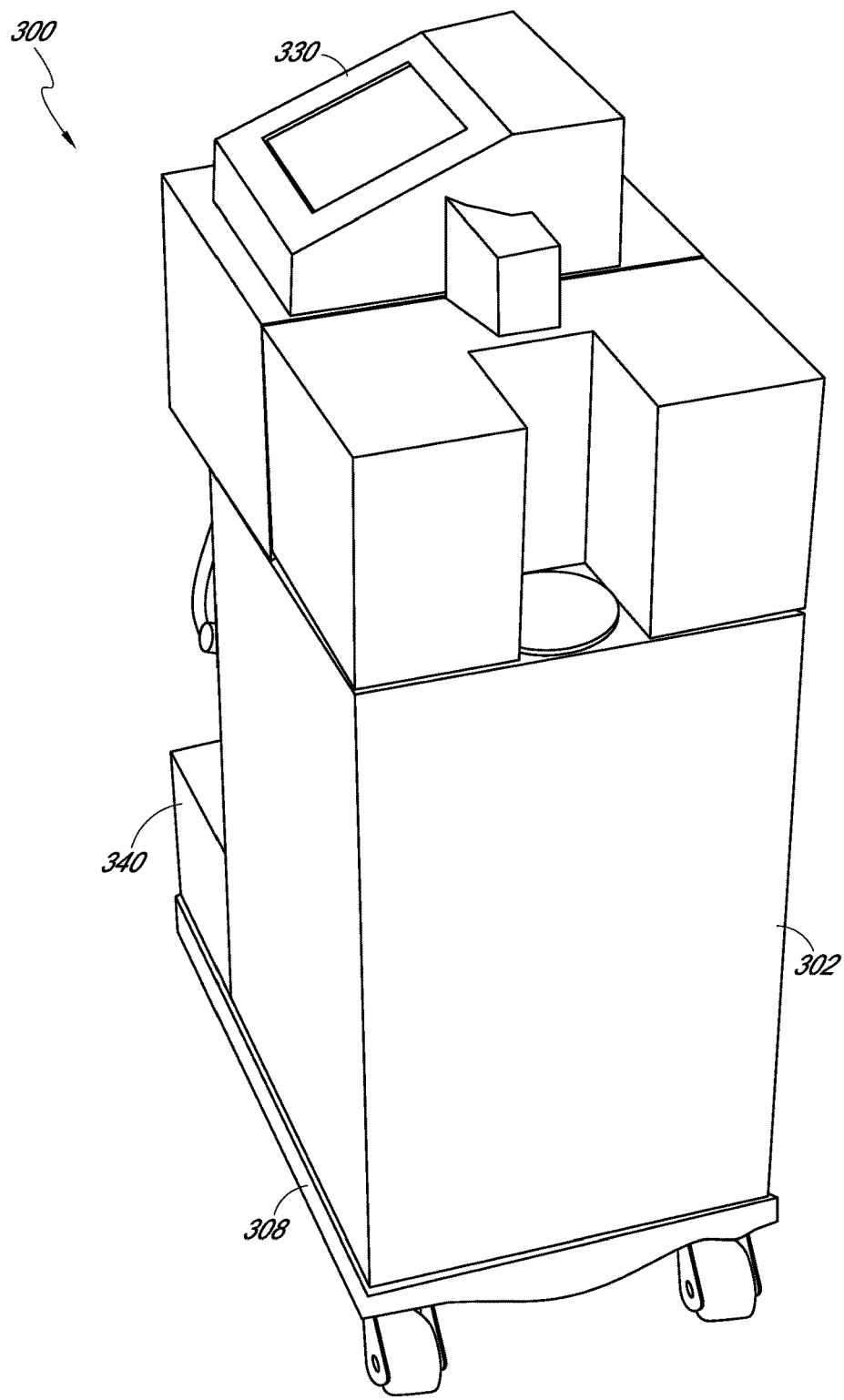

Referring now to FIGS. 10A and 10B another embodiment of a cooking oil storage and filtration system 300 is shown. As shown, the system 300 includes a main housing 302 that houses both a used oil storage tank 304 (FIG. 11) and a new oil storage tank 306. The hosing 302 is mounted on a platform 308 that is mounted on wheels in the previously described manner so that the system 300 is movable in the previously described manner. The dimensions of the current system can be the same as previously described or can vary depending upon the implementation.

As shown in FIGS. 10A and 10B, there is also a shelf 312 that accommodates a course filtration housing 314 and a fine filtration housing 340 that is similar to the embodiment described above in connection with FIGS. 8 and 9. In one implementation, there is a four stage filtration system that includes a top screen that is a course stainless steel screen with holes of 0.125" in diameter then a fine mesh stainless steel screen in the course filtration housing 314. The fine filtration housing 340 can include a fine stainless steel mesh with option 25 micron filtering fiber and then a super fine stainless steel mesh with 5 micron filtering fiber. It will be appreciated that the screens have to be removable, in the manner shown above to permit cleaning and replacement of clogged screens. It will also be appreciated that the exact configuration of screens can vary without departing from the sprit or scope of the present invention.

In this implementation, the housing 302 can also house a pump and valve assembly 320 that is similar to the pump and valve assembly described above. In this implementation, the pump and valve assembly includes a 5.8 gallon per minute roller pump with a ½ house power 120 volt motor and the valve assembly comprises 4½ ball valves with electrical activation. The combination of the pump and valves in the assembly 320 permits the smart control of the flow of cooking oil via user activation of a touch screen/display 330 through the use of a computerized control system 350. The various tanks of the system 300 can also include recessed sight glass windows so that visual verification of the levels of the tanks can also be done.

As shown in FIGS. 10A and 10B the touch screen/display 330 is mounted on top of the housing 302 and is generally flat so as to be easily accessible by an operator. The system also includes a wand 317 similar to the wand described above. The want 317 can be used to either dispense oil from the system 300 to a fryer or other cooking device or dispense used oil to a storage facility. The touch screen/display 330 can, in this implementation be used to control the flow of oil through the system 300.

Figure 11:
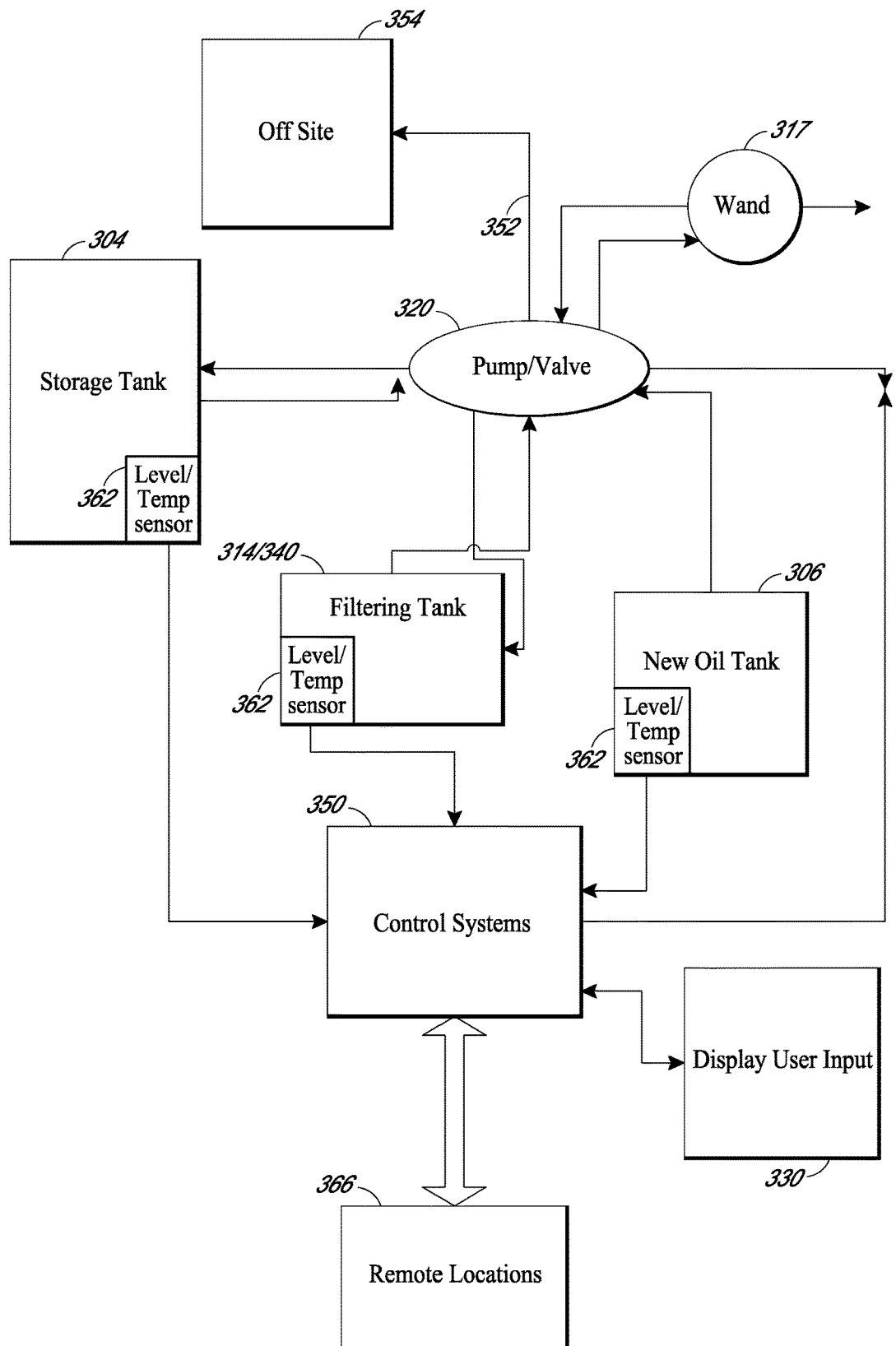
FIG. 11 is a schematic of the system of FIGS. 10A and 10B.

Referring now to FIG. 11, the operation of the oil storage and filtration system 300 will be described. As shown, there is a computerized control system 350 that interfaces with the user interface which, in this embodiment, comprises a touch screen with display 330. It will, however, be appreciated that user interfaces such as buttons and gauges can also be used to effectuate control of the system 300 without departing from the spirit and scope of the present invention.

In this embodiment, the user via the user inputs can control the pump and valve system 320 to perform the following operations. Oil can be taken from the cooling location via the want 317 into the filtering system 314/340 and this oil can then be returned via the wand 317 to the cooking location. This allows for oil to be easily filtered and then provided back to the cooking equipment.

Alternatively, oil from the cooking location can be extracted by the wand 317 and then provided to the storage tank 304 for subsequent disposal. Disposal of used oil in the storage tank 304 can be done either by pumping the oil out via the wand 317 or a separate discharge nozzle 352 can be used to remove the oil from the storage tank 304 in a container for transport to off-site storage 354. The pump system 320 can also take oil out of the storage tank 304 and run it through the filtering system 314/340 although it is contemplated that oil that is stored in the storage tank 304 is generally used oil that is sufficient used that it is being stored for disposal and replacement. As is also shown in FIG. 11, new oil 306 can also be stored and then provided via the pump and valve system 320 to the wand 317 so that oil can be placed into the cooking apparatus.

As is also shown in FIG. 11, a plurality of sensors such as level and temperature sensors 362 can also be installed on the various tanks to provide an indication of the level of the oil in each of the tanks as well as the temperature in the tanks. In this implementation, the sensors are commonly available level and temperature sensors known in the art. The readings of these sensors can be used to provide a running tally of the oil that is available in each of the tanks. Further, the volume of oil dispensed per time period, e.g., oil dispensed by day, per week etc. from each of the tanks can be monitored by the control system 350 and this information can be provided to a user. The system 320 can also monitor the amount of filtering that has been done over a period of time.

Further, as shown, the control system 320 can also include a known communications system such as an internet or intranet based wireless system that allows for the storage volume, oil dispensed volume, temperature, filtration time and frequency to be transmitted remotely. This information can be transmitted to a remote location 366 which can include an office or headquarters for the restaurant. Further, the control system 350 or a functionality of the remote location 366 can also be implemented whereby the oil collection company is notified when there is sufficient oil in the storage tank 304 to warrant collection of the oil.

Figure 12:
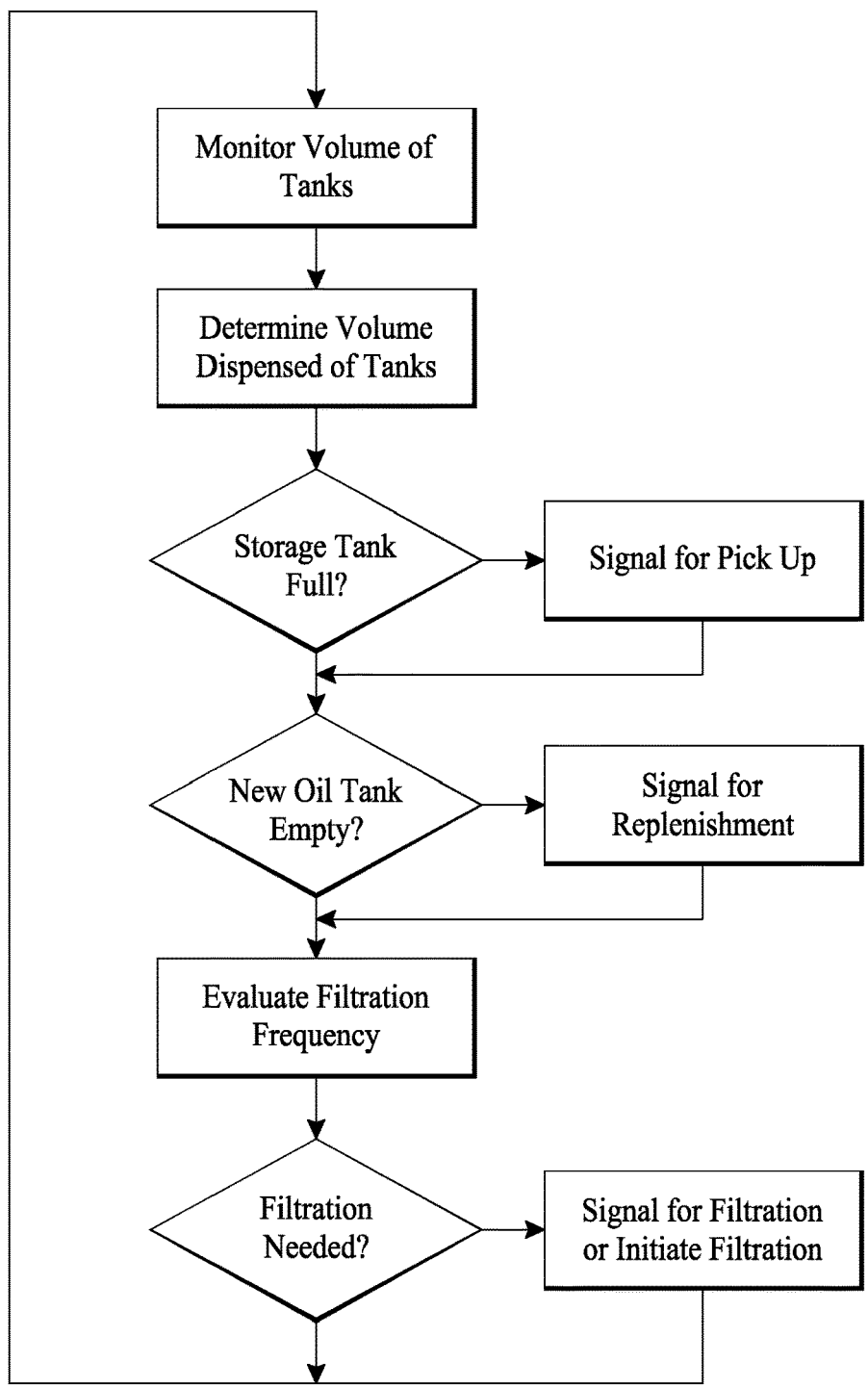
FIG. 12 is an exemplary flow chart illustrating how the control system of the embodiment of FIGS. 10A and 10B operates.

FIG. 12 is an exemplary process by which the control system 350 can monitor tank volumes and the operation of the pump and valve system 320. As shown, the volumes can be monitored via the sensors 362. If the storage tank 304 is full, the system 350 can signal for pick-up of the used oil. This signal can either be a local signal on the device or can be a transmission to a remote location such as an office 366 or to the company that is in charge of picking up the oil. Similarly, the if the new tank is empty, a similar signal for replenishment of the oil can be sent. The filtration of the cooking oil can also be monitored by evaluating the control signals being sent to the pump and valve system 320 and the volume of the oil that is being pumped. An internal clock of the control system can be used to determine the filtering frequency and if there is insufficient filtering, a signal can also be sent. The temperature of the oil can also be monitored and appropriate signals can be sent in a similar way if the temperature of the new oil, the stored oil or the oil being withdrawn for filtering appears to be out of range.

The system therefore provides for a more controllable oil storage and filtration system. The system is smart in that it can monitor parameters that the cook staff may be too busy to monitor or insufficiently knowledgeable to monitor. The system also allows for either manual operation of the pumping or, in some instances, the operation could be automated at pre-planned intervals or when the sensed parameters suggesting filtering or pumping of oil is needed.

While the aforementioned description has shown, illustrated and described various systems and methods of implementing the present invention, it will be apparent that various substitutions, modifications, and changes to the implementation of these systems and methods can be made by a person of ordinary skill in the art without departing from the teachings of the present invention. Hence, the present invention should not be limited in scope to the foregoing description but should be afforded the full scope of the equivalents and changes understood by a person of ordinary skill in the art.

What is claimed is:

1. A cooking oil storage and filtration system for use in a kitchen with a cooking oil reservoir and a filtering pan, the filtration system comprising:
   a used oil storage tank for storing used oil;
   a new oil storage tank for storing new oil;
   an oil dispensing and removing system for dispensing oil to and removing oil from an external location;
   a filtration system for filtering used oil;
   a pump and valve system that removes oil via an oil inlet/outlet system from an external source and provides the oil to the filtration system, wherein the pump and valve system further either provides the oil to the used oil storage tank or returns the oil via the oil inlet/outlet system to the external source;
a first plurality of sensors installed on the new oil storage tank, the first plurality of sensors determining a first level and a first temperature of oil in the new oil storage tank;
a second plurality of sensors installed on the used oil storage tank, the second plurality of sensors determining a second level and a second temperature of oil in the used oil storage tank; and
a control system with a user interface that permits an operator to control the operation of the system, the control system configured to monitor a first volume in the new oil storage tank via the first plurality of sensors and configured to monitor a second volume in the used oil storage tank via the second plurality of sensors, the control system configured to determine a filtration frequency based on at least one of: the first volume, the first temperature, the second volume, or the second temperature, the filtration frequency associated with volume of oil pumped through the filtration system,
wherein:
the control system includes a communications component that signals to a remote location the first volume and the second volume to signal to the remote location when to replenish the new oil storage tank and when to collect the used oil;
the control system monitors and calculates the volume of oil dispensed from the used oil storage tank and the new oil storage tank per unit of time based at least on the first volume and the second volume;
the control system provides alerts when the first volume is below a first predetermined value or the second volume exceeds a second predetermined value;
the control system actuates the pump and valve system to filter the used oil when the filtration frequency is below a predetermined threshold frequency; and
the control system actuates the pump and valve system to filter the used oil when the first temperature and the second temperature are out of range.

2. The system of claim 1, wherein the used oil storage tank, the filtration system, and the pump and valve system are mounted within a housing.

3. The system of claim 2, wherein the used oil storage tank, the new oil storage tank, and the pump and valve system are mounted within an interior storage volume of the housing.

4. The system of claim 3, wherein the filtration system further comprises a filtration pan, and wherein the filtration pan is mounted within the interior storage volume of the housing.

5. The system of claim 1, wherein the oil dispensing and removal system comprises a wand that can either suck up oil or deposit oil into the external location using the pump and valve system.

6. The system of claim 1, wherein the user interface is a touch screen.

7. The system of claim 1, wherein the oil is transferred from the new oil storage tank to the old oil storage tank via the pump and valve system.

8. A cooking oil storage system comprising:
a filtration system that filters cooking oil;
a used oil storage tank;
a new oil storage tank;
an oil dispensing and removing system that dispenses oil to and removes oil from an external source;
a pump and valve system that is coupled with the used oil tank, the new oil tank, and the oil dispensing and removing system to permit oil to be dispensed and removed, filtered and stored;
a first plurality of sensors that determine a first level and a first temperature of oil in the new oil storage tank;
a second plurality of sensors that determine a second level and a second temperature of oil in the used oil storage tank;
a control system that has a user interface that permits control of the pump and valve system, the control system configured to monitor a first volume in the new oil storage tank via the first plurality of sensors and configured to monitor a second volume in the used oil storage tank via the second plurality of sensors; and
a housing that houses the used oil storage tank, the new oil storage tank, the oil dispensing and removing system, the filtration system, the pump and valve system, and the control system,
wherein:
the control system determines a filtration frequency based at least on the first volume, the second volume, the first temperature, and the second temperature, the filtration frequency associated with volume of oil pumped through the filtration system;
the control system includes a communications component that signals a remote location the first volume and the second volume to signal to the remote location when to replenish the new oil tank and when to collect the used oil;
the control system monitors and calculates the volume of oil dispensed from the used oil storage tank and the new oil storage tank per unit of time based at least on the first volume and the second volume;
the control system provides alerts that the oil should be added when the first volume is below a first predetermined volume or that the oil should be removed when the second volume exceeds a second predetermined volume;
the control system actuates the pump and valve system to filer the used oil when the filtering frequency is below a predetermined threshold frequency; and
the control system actuates the pump and valve system to filer the used oil when the first temperature and the second temperature are out of range.

9. The system of claim 8, wherein the used oil storage tank, the filtration system, and the pump and valve system are mounted within the housing.

10. The system of claim 9, wherein the used oil storage tank, the new oil storage tank, and the pump and valve system are mounted within an interior storage volume of the housing.

11. The system of claim 10, wherein the filtration system further comprises a filtration pan, and wherein the filtration pan is mounted within the interior storage volume of the housing.

12. The system of claim 8, wherein the oil dispensing and removal system comprises a wand that can either suck up oil or deposit oil into the external location using the pump and valve system.

13. The system of claim 8, wherein the user interface is a touch screen.

14. The system of claim 8, wherein the oil is transferred from the new oil storage tank to the old oil storage tank via the pump and valve system.

* * * * *